(12) United States Patent
Balakrishnan et al.

(10) Patent No.: US 9,298,797 B2
(45) Date of Patent: Mar. 29, 2016

(54) PRESERVING CONTENT ITEM COLLECTION DATA ACROSS INTERFACES

(71) Applicant: Dropbox, Inc., San Francisco, CA (US)

(72) Inventors: Ramesh Balakrishnan, San Francisco, CA (US); Rajeev Nayak, San Francisco, CA (US); Brian Smith, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/469,036

(22) Filed: Aug. 26, 2014

(65) Prior Publication Data

US 2014/0379643 A1 Dec. 25, 2014

Related U.S. Application Data (63) Continuation of application No. 13/772,071, filed on Feb. 20, 2013, now Pat. No. 8,856,161, which is a continuation of application No. 13/725,861, filed on Dec. 21, 2012, now abandoned.

(51) Int. Cl.
*G06F 17/00* (2006.01)
*G06F 17/30* (2006.01)

(52) U.S. Cl.
CPC .... *G06F 17/30581* (2013.01); *G06F 17/30312* (2013.01); *G06F 17/30336* (2013.01); *G06F 17/30994* (2013.01)

(58) Field of Classification Search
CPC .................. G06F 17/30864; G06F 17/30867; G06F 17/30; G06F 17/30386; G06F 17/30091

USPC .......................................................... 707/758
See application file for complete search history.

(56) References Cited

U.S. PATENT DOCUMENTS

2009/0282060 A1* 11/2009 Paulussen et al. ............. 707/100
2011/0320715 A1* 12/2011 Ickman et al. ................. 711/118

OTHER PUBLICATIONS

US Notice of Allowance dated Jun. 3, 2014, issued in co-pending U.S. Appl. No. 13/772,071.
US Office Action dated Sep. 26, 2013, issued in co-pending U.S. Appl. No. 13/772,071.
US Office Action dated Jun. 18, 2013, issued in co-pending U.S. Appl. No. 13/772,071.

* cited by examiner

*Primary Examiner* — Truong Vo
(74) *Attorney, Agent, or Firm* — Novak Druce Connolly Bove + Quigg LLP (57) ABSTRACT

Systems, methods, and computer-readable storage media for preserving collection data across interfaces are disclosed. The system can generate, for a collection of content items stored in multiple user accounts in a synced online content management system, an index of the content items in the collection. The index can store, a content item identifier and a file location, for each content item. Upon detecting that a content item in the collection is moved to a new file location, the system can retrieve a collection identifier from metadata associated with the content item. The system can then locate the index for the collection associated with the collection identifier based on the collection identifier retrieved from the metadata associated with the content item. The system can then update the file location stored at the index for the content item to identify the new file location.

21 Claims, 6 Drawing Sheets

PRESERVING CONTENT ITEM COLLECTION DATA ACROSS INTERFACES

CROSS-REFERENCE TO RELATED APPLICATIONS

The present patent application is a continuation of and claims the benefit of U.S. Non-Provisional application Ser. No. 13/772,071, filed Feb. 20, 2013, which is a continuation of and claims the benefit of U.S. Non-Provisional application Ser. No. 13/725,861, filed Dec. 21, 2012. Said application is expressly incorporated herein by reference in its entirety.

TECHNICAL FIELD

The present technology pertains to content item collections and more specifically pertains to preserving content item data across interfaces by preserving content item tags.

BACKGROUND

Media recording capabilities, such as photographing and video recording, have been integrated with remarkable regularity in a score of common, everyday devices. The ubiquity of such media recording capabilities has prompted a growing demand for media applications. In particular, users are interested in applications to access media stored on different devices and to share media with other users. The Internet has further fueled the demand for media applications by greatly expanding the amount of media available to users and providing an ever-widening audience for conveniently sharing media.

Numerous browser-based tools and client applications have emerged that allow users to share and access media from any Internet-connected device. For example, image search engines allow users to search the Web for image content and browse the searched photos through a web browser. Other browser-based tools and services, such as social networking sites, similarly allow users to view and share photos through a web browser. Similar functionality also exists in native client applications.

Given the wide availability of media, users can typically access media files stored across multiple interfaces, such as a web interface and a desktop interface, from one or more user devices. To make sense of the numerous media files, users can create albums to organize and view groups of media files based on shared characteristics. For example, a user can create an album for an event, and add the different photos associated with that event to the album. Thus, the album contains pointers to the locations in data storage where the corresponding files or content items are stored. This way, the user can access the photos related to the event from a single place—the album—by accessing the pointers, without having to browse through different folders and/or interfaces where the specific photos are stored, and without having to navigate through photos that are not related to the event.

However, as time passes, the user can manipulate or rearrange the photos and folders that store the photos, moving and copying photos, and adding and deleting photos from folders. But many times, the user forgets to manually update the album to reflect the changes made to the photos and/or folders. Moreover, the albums do not automatically update themselves based on the changes and, therefore, fail to preserve album data when the user makes such changes. Accordingly, these changes to the photos and/or folders cause the album to break or fail to load/display all of the album data that the user expects. For example, the user may create an album based on photos in a first and second folder. The user may subsequently move a photo from the first folder to a third folder. If the user does not manually update the album to change the location of the photo from the first folder to the third folder, the album will not be able to find and display the photo, as it will continue to look for the photo in the first folder. As a result, the album will break or, at a minimum, fail to load and display the moved photo. And as the user manages a greater number of photos, folders, and albums, it becomes increasingly difficult to update the albums to preserve the album data.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following description and accompanying drawings, or can be learned by the practice of the principles set forth herein.

The approaches set forth herein can be used to preserve data related to collections of content items, such as albums of photos, via collection tags so that collections persist even after files are moved or otherwise manipulated via various file interfaces. Each content item in a collection can be associated with a respective tag, which can be preserved throughout the life of the item, even if the content item is copied, moved, and/or modified. The tag can include a collection identifier to identify which collection the item has been associated with. An item can be associated with more than one collection and, by extension, more than one tag. When the collection item is copied, renamed, moved, and/or modified, an index of items associated with the collection identified by the tag can be automatically updated to note the correct location and/or address of the item after the change. The collection can then reference the index of items to keep track of the location of the items in the collection and the changes made to those items. This way, the collection can preserve the collection data even after the user makes changes to the data and/or the directory. Moreover, the user does not have to update the collection manually to change the location of the item in order to prevent the collection from breaking or encountering missing item and addressing errors.

Disclosed are systems, methods, and non-transitory computer-readable storage media for preserving collection data. The system generates, for a collection of content items stored in multiple user accounts in a synced online content management system, an index of the content items in the collection, wherein the index stores, for each content item in the collection, a content items identifier and a file location, wherein the collection is associated with a collection identifier, and wherein metadata for each content item in the collection stores the collection identifier. Upon detecting that a content item in the collection is moved to a new file location, the system can retrieve the collection identifier from the metadata associated with the content item. The system can detect that the content item in the collection was moved to a new file location when the content item is moved and/or renamed, when a parent folder is moved and/or renamed, or when the address associated with the content item in the collection changes in any way. In other words, moving a content item to a new file location can mean moving and/or renaming the photo, moving and/or renaming a parent folder, and/or changing an address/path associated with the content item in the collection. For example, the system can retrieve the collection identifier from the metadata associated with the content item upon detecting that a uniform resource locator (URL), uniform resource identifier (URI), uniform resource name (URN), containing folder, and/or file system path associated with the content item in the collection has changed.

Next, the system can locate the index for the collection associated with the collection identifier based on the collection identifier retrieved from the metadata associated with the content item. The system can then update the file location stored at the index for the content item to identify the new file location. The system can also display the content item in the collection based on the new file location identified in the index for the content item. For example, when displaying a photo in an album, the system can refer to the index for the photo to obtain the new file location, and display the photo in the album by accessing the photo at the new file location.

The metadata for each content item can include a file tag. The file tag can include a respective collection identifier. The file tag can also include a respective content item identifier. The file tag can be created and/or associated with a content item when the content item is added to the collection, for example. Moreover, the file tag can be a persistent file tag. For example, each content item can be configured to preserve the file tag when the file location changes and/or the content item has been modified. This way, the file tag can be used to identify the content item and/or the collection even as the content item is copied, moved, renamed, etc. The file location can change when the content item is moved to a different location, when the content item is copied to a different location, when the content item is renamed, when a parent folder is moved and/or renamed, when an address associated with the content item changes, etc. Further, the system can detect when a content item in the collection, the collection, and/or a folder associated with the content item changes. For example, the system can detect that the content item in the collection has been moved to the new file location, and/or the address of the content item has changed to the new file location.

In some embodiments, the system can perform one or more steps synchronously. For example, the system can synchronously retrieve the collection identifier from the metadata associated with the content item, locate the index for the collection associated with the collection identifier, and/or update the file location stored at the index for the content item. In one variation, the system synchronously detects that the content item in the collection was moved to the new file location and updates the file location stored at the index for the collection.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The present disclosure provides a way to preserve data related to collections of content items, such as albums of photos, via collection tags so that collections persist even after files are moved or otherwise manipulated via various file interfaces. Each content item in a collection can be associated with a respective tag, which can be preserved throughout the life of the item, even if the content item is copied, moved, and/or modified. The tag can include a collection identifier to identify which collection the item has been associated with. An item can be associated with more than one collection and, by extension, more than one tag. When the collection item is copied, renamed, moved, and/or modified, an index of items associated with the collection identified by the tag can be automatically updated to note the correct location and/or address of the item after the change. The collection can then reference the index of items to keep track of the location of the items in the collection and the changes made to those items. This way, the collection can preserve the collection data even after the user makes changes to the data and/or the directory. Moreover, the user does not have to update the collection manually to change the location of the item in order to prevent the collection from breaking or encountering missing item and addressing errors.

Figure 1:
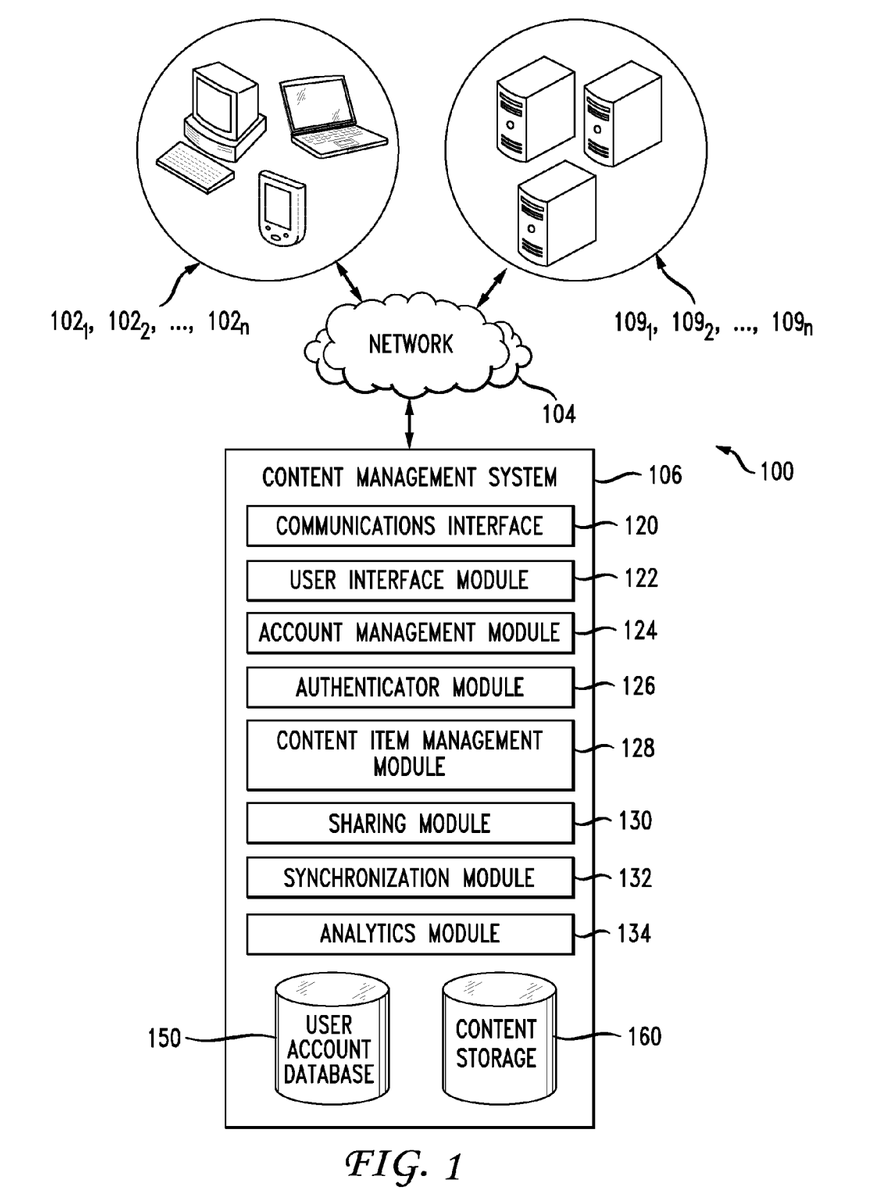
FIG. 1 shows an exemplary configuration of devices and a network in accordance with the invention.

An exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1, 102_2, \ldots, 102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content item management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible. For example, content management system 106 can include a collection updater module and/or a tag database.

The disclosure now turns to a discussion of preserving collections of content items, such as albums of photos, via tags. A person skilled in the art will recognize that while the disclosure frequently uses albums of photos to illustrate the technology, a content item can be of any file type organized in any collection without parting from the spirit and scope of the disclosure. For example, the collection of content items can be a playlist of music or a collection of documents.

Figure 2:
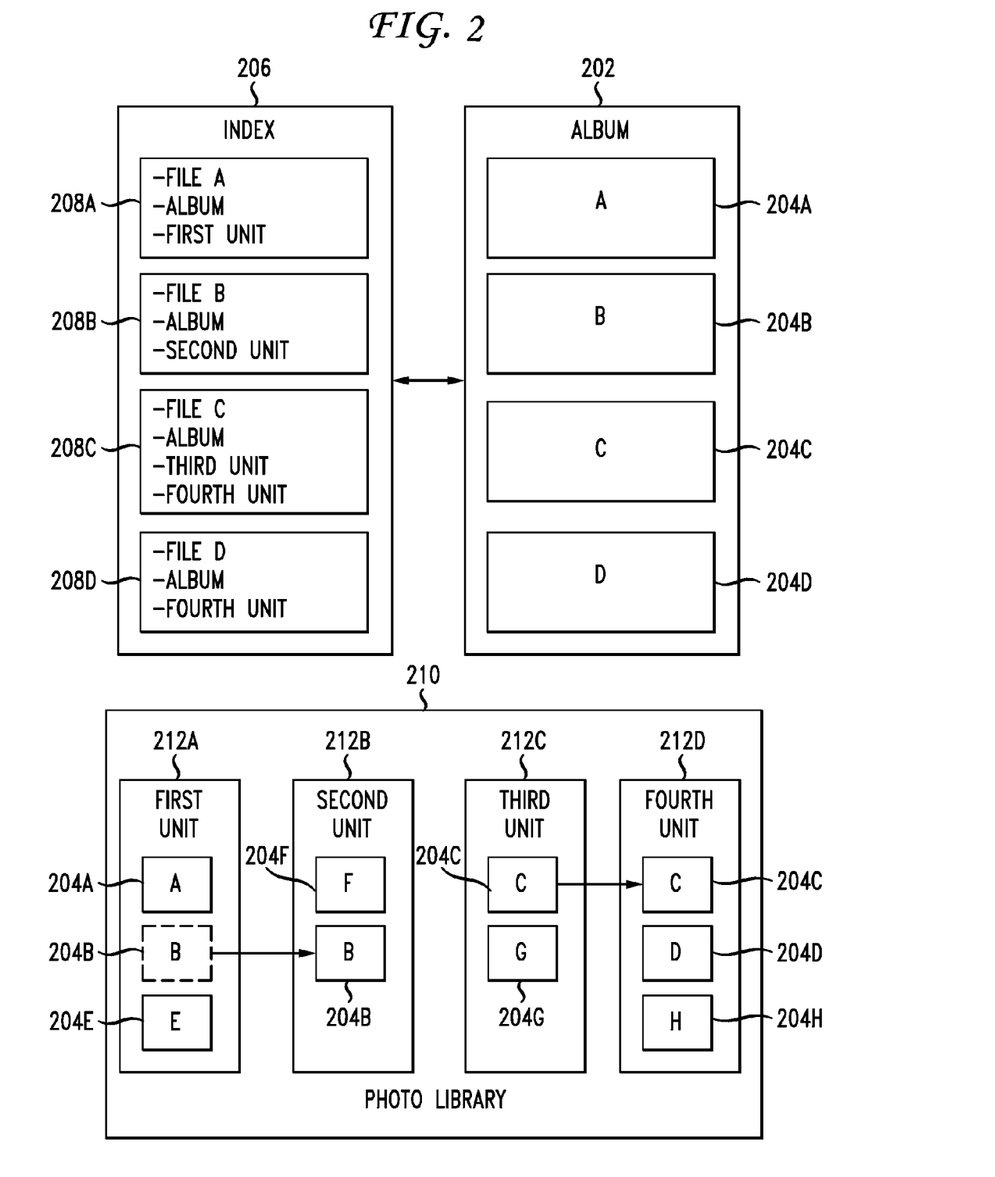
FIG. 2 shows an example of an index associated with an album of photos from different collections.

FIG. 2 illustrates an example of an index associated with an album of photos from different units. Here, album 202 is associated with index 206. Album 202 includes photos 204A-D, and index 206 contains records 208A-D for photos 204A-D in album 202. Each of records 208A-D includes a photo identifier, an album identifier, and a file location, but can include more or less data such as a unique album identifier and a unique file identifier from which a file location can be determined. The photo identifier can identify the photo associated with the record, the album identifier can identify the album associated with the photo, and the file location can specify the location of the photo. Records 208A-D in index 206 are updated as album 202 and/or photos 204A-D in album 202 are changed. For example, if photo 204A in album 202 is moved to a new location, record 208A for photo 204A is then updated to reflect the new location of photo 204A. This way, album 202 can refer to index 206 to ensure that all of the album data is properly preserved in album 202. In one variation, the album identifier for a file is not an album identifier but instead a head pointer to a linked list of albums with which the file is associated, for example.

In FIG. 2, photos 204A-D are stored in photo library 210. Photo library 210 can be stored in a network-based storage that is accessible via a desktop interface and/or a web interface, for instance. Photo library 210 can include photo units 212A-D, which store photos 204A-H. For example, first unit 212A contains photos 204A-B and 204E. First unit 212A contained photo 204B at one point, but photo 204B has since been moved to second unit 212B. Second unit 212B stores photos 204F and 204B, which was moved from first unit 212A. Third unit 212C stores photos 204C and 204G, and fourth unit 212D stores photos 204D, 204H and a second instance of photo 204C, which was copied from third unit 212C. As illustrated, photos 204A-D in album 202 are stored across multiple photo units 212A-D. Thus, album 202 can include photos from multiple photo units. In some variations, album 202 can also include photos stored in multiple photo libraries, devices, or both. Units 212A-D can represent actual or logical directories or folders in a hierarchical storage schema.

For album 202 to properly include, display, and/or access photos 204A-D in album 202, the system can obtain the location of photos 204A-D from index 206, which maintains updated records of the location of photos 204A-D in album 202. Thus, if any of photos 204A-D are renamed, moved, and/or copied to a different location, album 202 will still be able to include, display, and/or access photos 204A-D, as it will know the location of photos 204A-D from the locations recorded in index 206. For example, when photo 204B is moved from first unit 212A to the second unit 212B, the system can intercept that 'move' operation and update index 206 to include the new location of photo 204B at record 208B, which is associated with photo 204B. The system can intercept or monitor file operations that modify a photo in an album, such as move, rename, or delete, and update index 206 accordingly. In one variation, the system can update index 206 simultaneously with performing the operation, but the system can alternatively update index 206 upon successful completion of the operation. Similarly, when photo 204C is copied from third unit 212C to fourth unit 212D, index 206 can be updated to include both locations of photo 204C at record 208C, which is associated with photo 204C. Accordingly, index 206 can track the location of photos 204A-D in album 202 as photos 204A-D are copied and/or moved to different locations.

In some embodiments, when a photo is copied to a different file location, index 206 can store multiple file locations associated with the photo. Here, index 206 can store the original file location of the photo and the destination of the copied photo. In one variation, when index 206 includes multiple file locations associated with a photo, album 202 only presents a single instance of the photo based on one of the file locations.

In some embodiments, index 206 does not include more than one file location for a single photo. Here, if a photo is copied to a different location, index 206 can store the original file location or replace the original file location with the file location associated with the destination of the copied photo. Although FIG. 2 shows the album, index, and photo library as single elements, those of skill in the art can understand that the album, index, and/or photo library can include multiple elements. Moreover, some embodiments can include multiple albums, indexes, and/or photo libraries.

Figure 3:
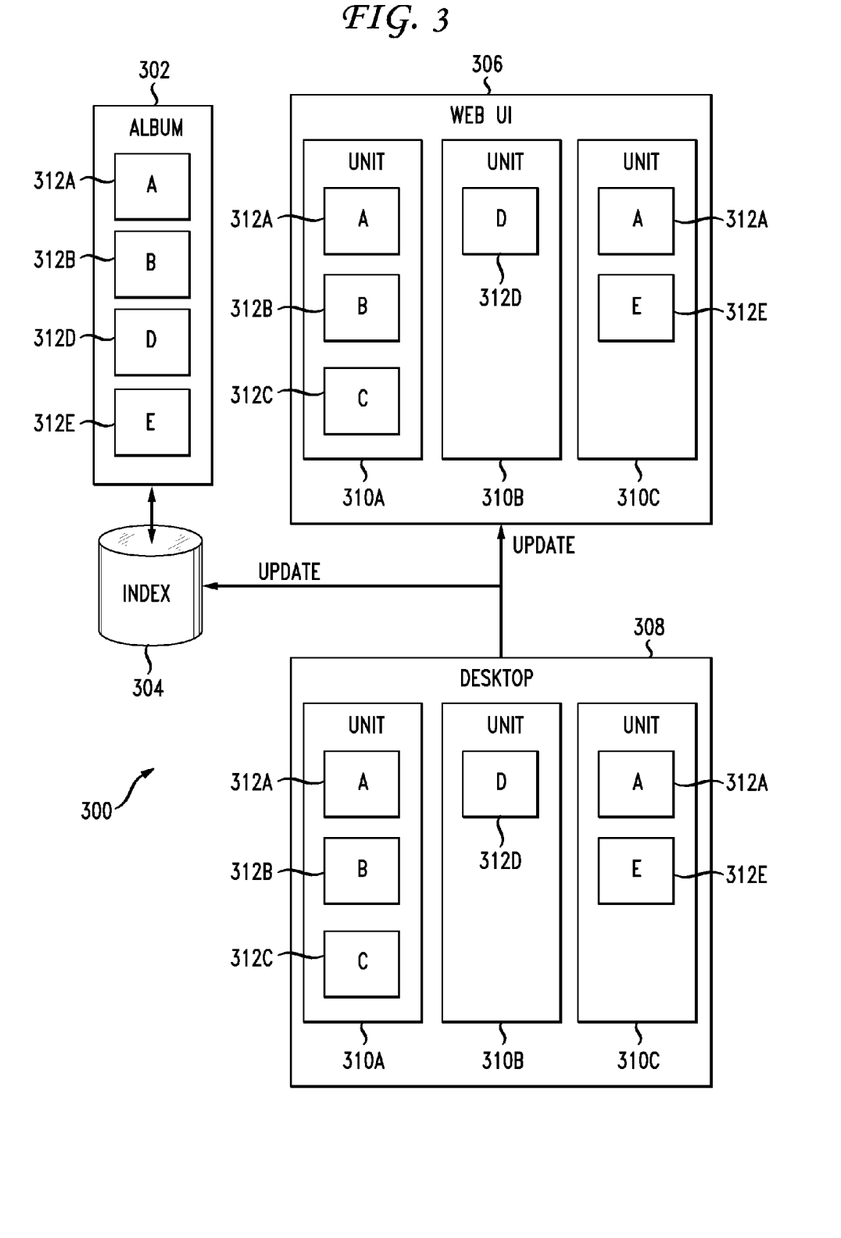
FIG. 3 shows an example of a system for preserving album data across interfaces.

FIG. 3 illustrates an example system 300 for preserving album data via album tags and an index. System 300 can be part of system 100 in FIG. 1. System 300 can include desktop interface 308 and web user interface 306 as example interfaces through which a user can modify or move files, but other types of interfaces can be used as well. Desktop interface 308 has photo units 310A-C, such as folders that contain photos 312A-E. Web user interface 306 similarly has photo units 310A-C, such as folders that contain photos 312A-E. The system 300 can synchronize data stored at the content management system such that web user interface 306 is consistent with desktop interface 308, and vice versa, to ensure that the data is the same at both places, so users can access the same information from desktop interface 308 and web user interface 306.

Users can view photos 312A-E and modify photos 312A-E and/or photo units 310A-C from desktop interface 308 and/or web user interface 306. Any changes to photos 312A-E and/or photo units 310A-C can get pushed to web user interface 306, and vice versa, in order to maintain desktop interface 308 and web user interface 306 synchronized. Users can also view photos 312A-B and 312D-E from album 302. Users can access album 302 from web user interface 306 and/or desktop interface 308. Album 302 can include photos 312A-B and 312D-E, which are stored at photo units 310A-C. Users can view photos 312A-B and 312D-E from album 302 as if photos 312A-B and 312D-E were stored at a single place, even though photos 312A-B and 312D-E are stored in various photo units. Album 302 has an index 304, which can store a record for each photo in album 302. Index 304 can be a database, a file, a table, a list, etc. Index 304 can include records associated with photos 312A-B, 312D-E in album 302.

Each record in index 304 can be associated with a specific photo in album 302. A record can store the photo identifier of the associated photo, the album identifier of the album associated with the photo, and the location of the photo. If the location of the photo changes, system 300 can automatically update the record associated with the photo to indicate the new location of the photo. For example, when photo 312B is moved from first photo unit 310A to second photo unit 310B, system 300 can update the record associated with photo 312B to indicate that photo 312B was moved to second photo unit 310B. As another example, when photo 312A is copied from first photo unit 310A to third photo unit 310C, system 300 can update the record associated with photo 312A to indicate that photo 312A was copied to third photo unit 310C.

System 300 can update index 304 synchronously when it detects a change to the address associated with photos 312A-B, 312D-E and/or photo units 310A-C. In some embodiments, system 300 can detect changes based on synchronization updates sent from desktop interface 308 to web user interface 306. Based on the detected changes, system 300 can send an update to index 304 to ensure that the information in index 304 is current. For example, when photo 312B is moved from first photo unit 310A at desktop interface 308 to second photo unit 310B, desktop interface 308 can send a synchronization update to web user interface 306 indicating that photo 312B was moved. Web user interface 306 can use the synchronization update to update photo units 310A and 310B at web user interface 306 to reflect this change. System 300 can also use the synchronization update to detect that photo 312B has been moved, and send an update to index 304 to indicate that photo 312B has been moved to second photo unit 310B, and record the new file location of photo 312B. This way, index 304 reflects the current information for photos 312A-B and 312D-E in album 302. Album 302 can thus obtain the current location of photos 312A-B and 312D-E from index 304, in order to preserve the album data even as the album data is moved and/or modified.

To preserve album data, each of photos 312A-E can have a tag that indicates the album identifier of the album(s) the photo is associated with. The tags can help identify the album(s) associated with a photo, which can be used to identify which index should be updated when the photo is modified, copied, renamed, moved, etc. For example, photo 312B has a tag that includes an album identifier that identifies album 302 as being associated with photo 312B. This association can then be used to identify index 304 as the index that should be updated when photo 312B is modified, moved, renamed, copied, etc. Thus, when photo 312B is modified, moved, renamed, copied, etc., the album identifier in the tag can be used to identify both album 302 and index 304, so the change can then be stored in the appropriate index. The tags on photos 312A-E can be preserved through the life of photos 312A-E. Here, the tags can persist through any changes made to photos 312A-E. Moreover, the tags can be part of photo metadata of photos 312A-E.

Figure 4:
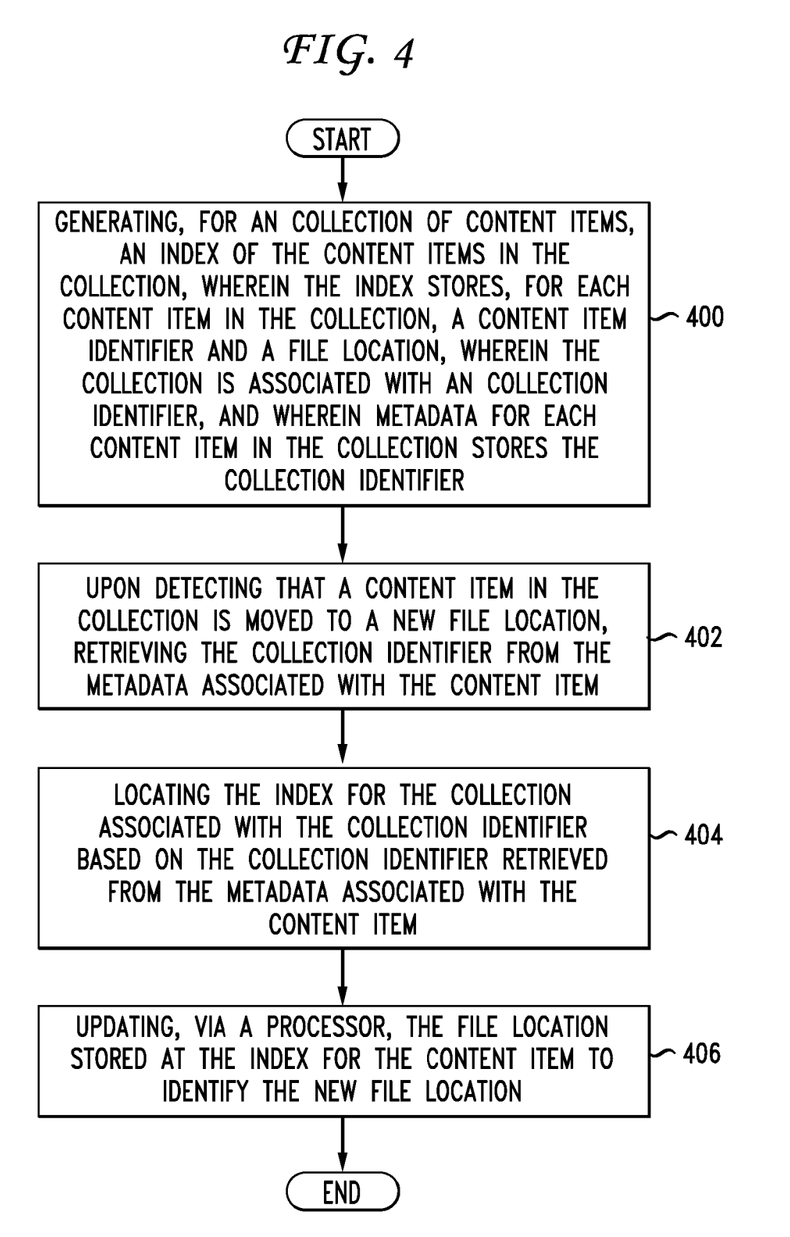
FIG. 4 shows an example method embodiment.

Having disclosed some basic system components and concepts, the disclosure now turns to the example method embodiment shown in FIG. 4. For the sake of clarity, the method is described in terms of example content management system 106, as shown in FIG. 1, configured to practice the method. The steps outlined herein are illustrative and can be implemented in any combination thereof, including combinations that exclude, add, or modify certain steps.

Content management system 106 can generate, for a collection of content items, an index of the content items in the collection, wherein the index stores, for each content item in the collection, a content item identifier and a file location, wherein the collection is associated with a content item identifier, and wherein metadata for each content item in the content item stores the collection identifier (400). Upon detecting that a content item in the collection is moved to a new file location, content management system 106 can retrieve the collection identifier from the metadata associated with the content item (402). Content management system 106 can detect that the content item in the collection was moved to a new file location when the content item is moved and/or renamed, when a parent folder is moved and/or renamed, or when the address associated with the content item in the collection changes in any way. In other words, moving a content item to a new file location can mean moving and/or renaming the photo, moving and/or renaming a parent folder, and/or changing an address/path associated with the content item in the collection. For example, content management system 106 can retrieve the collection identifier from the metadata associated with the content item upon detecting that a uniform resource locator (URL), uniform resource identifier (URI), uniform resource name (URN), and/or file system path associated with the content item in the collection has changed.

Next, content management system 106 can locate the index for the collection associated with the collection identifier based on the collection identifier retrieved from the metadata associated with the content item (404). Content management system 106 can then update the file location stored at the index for the content item to identify the new file location (406). Content management system 106 can also display the content item in the collection based on the new file location identified in the index for the content item. For example, content management system 106 can refer to the index for the content item to obtain the new file location of the content item, and display the content item in the collection by accessing the content item at the new file location. This way, the collection is always aware of the location of the content items in the collection, even as content items are moved and copied to various storage locations. As a result, the collection can always load/display the content items without encountering errors from missing files and addressing issues caused by changes made to the location of content items.

The metadata for each content item can include a content item tag. The file tag can include a respective collection identifier. The tag can also include a respective content item identifier. The tag can be created, modified, and/or associated with a content item when the content item is added to the collection, for example. Moreover, the tag can be a persistent tag. For example, each content item can be configured to preserve the tag when the file location changes and/or the content item is modified. This way, the tag can be used to identify the content item and/or the collection even as the content item is copied, moved, modified, etc.

The file location of the content item can change when the content item is moved to a different location, when the content item is copied to a different location, when the folder containing the content item is moved to a different location, when the folder containing the content item is renamed, when a segment of the path of the content item changes and/or is renamed, when an address associated with the content item changes, etc. Further, content management system 106 can detect when a content item in the collection, the collection, and/or a folder associated with the content item changes. For example, content management system 106 can detect that the content item in the collection has been moved to the new file location. Content management system 106 can receive an update, such as a synchronization update, and determine from the update if the file location of the content item has changed. Content management system 106 can also analyze a log of changes made to the content items, which can be maintained by content management system 106 or a separate device, and determine if the file location of the content item has changed. Moreover, content management system 106 can monitor one or more directories of content items to identify when a file operation is performed, and determine if the file location of the content item has changed based on the file operation. If the file location of the content item has changed, content management system 106 can identify the new file location of the content item from the update, log, and/or file operation, and update the index to identify the new file location of the content item.

Figure 5A:
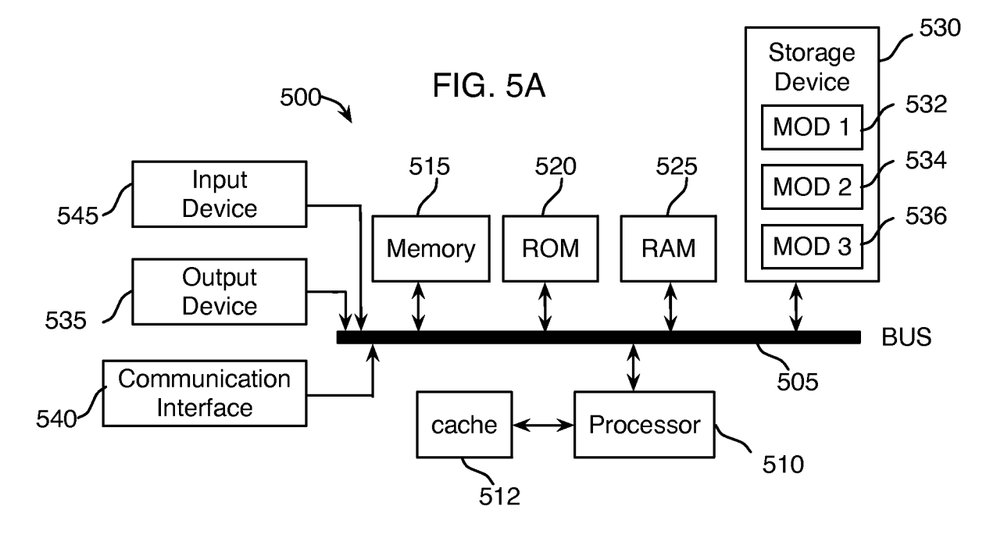
FIG. 5A shows a conventional system bus computing system architecture.
Figure 5B:
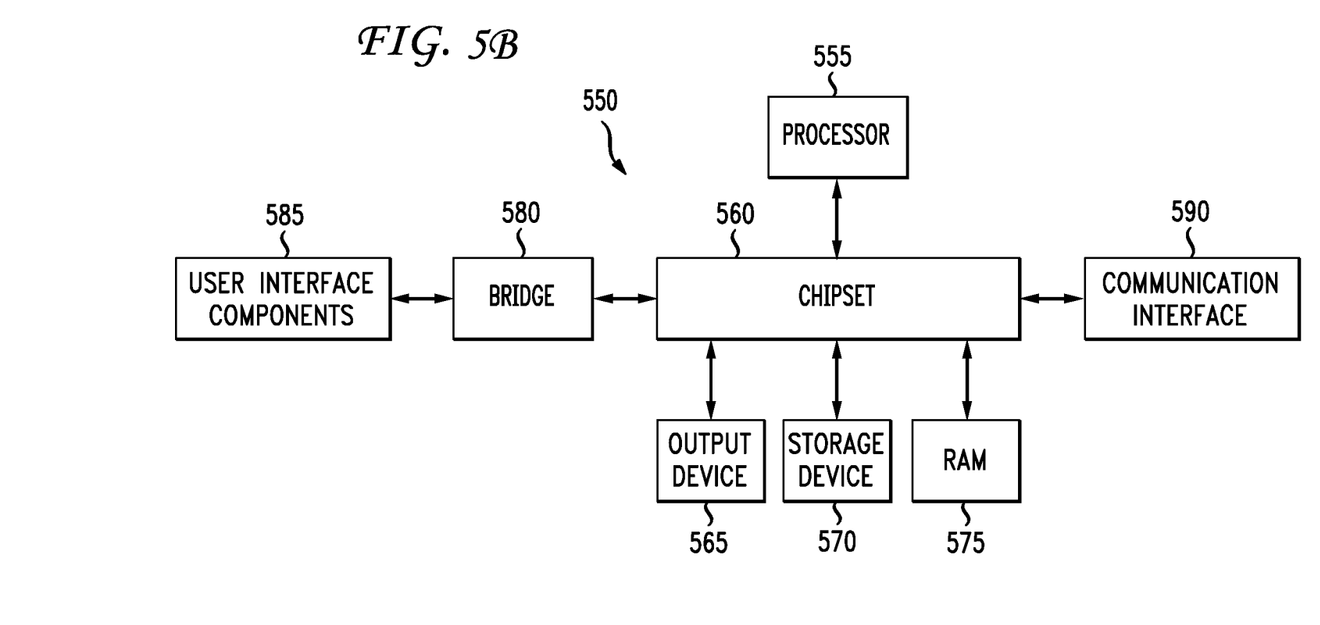
FIG. 5B shows a computer system having a chipset architecture.

FIG. 5A, and FIG. 5B show exemplary possible system embodiments. The more appropriate embodiment will be apparent to those of ordinary skill in the art when practicing the present technology. Persons of ordinary skill in the art will also readily appreciate that other system embodiments are possible.

FIG. 5A shows a conventional system bus computing system architecture 500 wherein the components of the system are in electrical communication with each other using a bus 505. Exemplary system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B shows a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that exemplary systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   generating by a processor, for a collection of content items stored in a user account in a synchronized online content management system, an index of the content items in the collection, wherein the index is associated with a collection identifier assigned to the collection and the index stores, for each content item in the collection, a content item identifier and a file storage location, and wherein for each content item in the collection the collection identifier is stored in metadata of the content item;
   in response to detecting by a processor, a move operation associated with a content item in the collection, automatically updating the index to reflect the move operation, thereby preserving the composition of the collection, wherein updating the index comprises:
   retrieving, by a processor, the collection identifier from the metadata associated with the content item upon a content item in the collection being moved to a new file storage location;
   locating, by a processor, the index for the collection associated with the collection identifier retrieved from the metadata associated with the content item; and
   updating, by a processor, the file storage location stored in the index for the content item to identify the new file storage location.

2. The method of claim 1, further comprising synchronizing the index for the collection of content items to multiple devices associated with the online content management system.

3. The method of claim 1, further comprising displaying the content item in the collection by accessing the new file location identified in the index for the content item.

4. The method of claim 1, wherein the metadata for each content item comprises a persistent tag comprising a respective content item identifier and a respective collection identifier, wherein each content item is configured to preserve the persistent tag when the file location changes.

5. The method of claim 4, wherein the file location changes when at least one of a respective content item is moved to a different location or the respective content item is copied to the different location.

6. The method of claim 1, wherein retrieving the collection identifier from the metadata associated with the content item, locating the index for the collection associated with the collection identifier, and updating the file location stored in the index for the content item are performed synchronously.

7. The method of claim 1, further comprising detecting that the content item in the collection was moved to the new file location.

8. The method of claim 7, wherein detecting that the content item in the collection was moved to the new file location and updating the file location stored at the index for the content item are performed synchronously.

9. The method of claim 1, wherein one or more of the collection of content items stored in the user account in the synchronized online content management system are shared with the user account from a different user account in the online content management system.

10. A system comprising:
    a processor; and
    a non-transitory computer-readable storage medium having stored therein processor-executable instructions for causing the processor to:
    generate, for a collection of content items stored in multiple user accounts in a synchronized online content management system, an index of the content items in the collection, wherein the index is associated with a collection identifier assigned to the collection and the index stores, for each content item in the collection, a content item identifier and a file location, and wherein for each content item in the collection the collection identifier is stored in metadata of the content item;
    in response to detecting a move operation associated with a content item in the collection, automatically updating the index to reflect the move operation, thereby preserving the composition of the collection, wherein updating the index further includes instructions for causing the processor to:
    retrieve, by the processor, the collection identifier from the metadata associated with the content item upon a content item in the collection being moved to a new file storage location;
    locate the index for the collection associated with the collection identifier based on the collection identifier retrieved from the metadata associated with the content item; and
    update the file location stored in the index for the content item to identify the new file location.

11. The system of claim 10, wherein the non-transitory computer-readable storage medium further stores instructions for causing the processor to display the content item in the collection based on the new file location identified in the index for the content item.

12. The system of claim 10, wherein the metadata for each content item comprises a persistent content item tag comprising a respective content item identifier and a respective collection identifier, wherein each content item is configured to preserve the persistent content item tag when the file location changes.

13. The system of claim 12, wherein the file location changes when at least one of a respective content items is moved to a different location or the respective content item is copied to the different location.

14. The system of claim 10, wherein retrieving the collection identifier from the metadata associated with the content item, locating the index for the collection associated with the collection identifier, and updating the file location stored in the index for the content item are performed synchronously.

15. The system of claim 10, wherein the non-transitory computer-readable storage medium further stores instructions for causing the processor to detect that the content item in the collection was moved to the new file location.

16. The system of claim 15, wherein detecting that the content item in the collection was moved to the new file location and updating the file location stored in the index for the content item are performed synchronously.

17. A non-transitory computer-readable storage medium having stored therein processor-executable instructions for causing a processor to:
- generate, for an album of content items stored in a user account in a synchronized online content management system, an index of the content items in the album, wherein the index is associated with a collection identifier assigned to the album and the index stores, for each content item in the album, a content item identifier and a file location, and wherein for each content item in the album the album identifier is stored in metadata of the content item;
- in response to detecting by a processor, a move operation associated with a content item in the album, automatically updating the index to reflect the move operation, thereby preserving composition of the album, wherein updating the index comprises further instructions to cause a processor to:
- retrieve the album identifier from the metadata associated with the content item upon the content item being moved to a new file storage location;
- locate the index for the album associated with the album identifier from the retrieved metadata associated with the content item; and
- update the file location stored in the index for the content item to identify the new file location.

18. The non-transitory computer-readable storage medium of claim 17, further storing instructions for causing a processor to display the content item in the album based on the new file location identified in the index for the content item.

19. The non-transitory computer-readable storage medium of claim 17, wherein the metadata for each content item comprises a persistent file tag comprising a respective content item identifier and a respective album identifier, wherein each content item is configured to preserve the persistent file tag when the file location changes.

20. The non-transitory computer-readable storage medium of claim 17, wherein retrieving the album identifier from the metadata associated with the content item, locating the index for the album associated with the album identifier, and updating the file location stored in the index for the content item are performed synchronously.

21. The non-transitory computer-readable storage medium of claim 17, further storing instructions for causing a processor to detect that the content item in the album was moved to the new file location.

\* \* \* \* \*